(12) United States Patent
Fyke et al.

(10) Patent No.: US 8,682,245 B2
(45) Date of Patent: Mar. 25, 2014

(54) COMMUNICATIONS SYSTEM PROVIDING PERSONNEL ACCESS BASED UPON NEAR-FIELD COMMUNICATION AND RELATED METHODS

(75) Inventors: Steven Henry Fyke, Waterloo (CA); Jason Tyler Griffin, Kitchener (CA); Scott Douglas Rose, Waterloo (CA); Christopher Lyle Bender, Tavlstock (CA)

(73) Assignee: BlackBerry Limited, Waterloo, Ontario (CA)

( * ) Notice: Subject to any disclaimer, the term of this patent is extended or adjusted under 35 U.S.C. 154(b) by 412 days.

(21) Appl. No.: 12/888,620

(22) Filed: Sep. 23, 2010

(65) Prior Publication Data

US 2012/0077431 A1 Mar. 29, 2012

(51) Int. Cl.
*H04B 5/00* (2006.01)

(52) U.S. Cl.
USPC .......................... 455/41.1; 455/410; 455/411

(58) Field of Classification Search
USPC ........ 455/411, 403, 41.1, 41.2; 713/156, 175, 713/158; 370/252; 726/8
See application file for complete search history.

(56) References Cited

U.S. PATENT DOCUMENTS

| 7,315,949 | B1 | 1/2008 | Cortopassi et al. |
| 7,706,778 | B2 * | 4/2010 | Lowe ............................ 455/411 |
| 8,150,374 | B2 * | 4/2012 | Lowe ............................ 455/411 |
| 2005/0030151 | A1 | 2/2005 | Singh |
| 2005/0242921 | A1 | 11/2005 | Zimmerman et al. |
| 2006/0170533 | A1 | 8/2006 | Chioiu et al. ................ 340/5.61 |
| 2007/0118891 | A1 * | 5/2007 | Buer ................................. 726/8 |
| 2007/0174612 | A1 | 7/2007 | Urban et al. .................. 713/168 |
| 2007/0190937 | A1 * | 8/2007 | Takayama ..................... 455/41.1 |
| 2007/0197261 | A1 | 8/2007 | Humbel ........................ 455/558 |
| 2008/0222417 | A1 | 9/2008 | Downes et al. |

(Continued)

FOREIGN PATENT DOCUMENTS

| DE | 10039956 | 3/2002 | ............. G08C 17/02 |
| DE | 10246663 | 4/2004 | ............... G07C 9/00 |

(Continued)

OTHER PUBLICATIONS

Vingcard "*Signature RFID' by VingCard + NFC-Compatible Cell Phones Awarded 'Best Innovation in the Technologies & Networks Category' at Equip Hotel in Paris*" Nov. 6, 2006: www.vingcard.com.

(Continued)

*Primary Examiner* — April G Gonzales
(74) *Attorney, Agent, or Firm* — Allen, Dyer, Doppelt, Milbrath & Gilchrist, P.A.

(57) ABSTRACT

A security system may include an access control device associated with a personnel access position. The access control device may include a first Near-Field Communication (NFC) sensor, and a first controller configured to selectively grant personnel access based upon receiving a valid security code from the first NFC sensor, and to deny personnel access and generate an access denial electronic message(s) based upon receiving an invalid security code from the first NFC sensor. The system may also include a mobile wireless communications device(s) including a second NFC sensor and a second controller, which may be configured to communicate a security code via the second NFC sensor to the first NFC sensor based upon proximity therewith, and to receive a corresponding access denial electronic message from the first controller based upon the security code being invalid.

23 Claims, 11 Drawing Sheets

(56) References Cited

U.S. PATENT DOCUMENTS

| | | | |
|---|---|---|---|
| 2009/0066476 A1 | 3/2009 | Raheman | 340/5.64 |
| 2009/0132624 A1 | 5/2009 | Haselsteiner et al. | 708/255 |
| 2009/0222659 A1* | 9/2009 | Miyabayashi et al. | 713/156 |
| 2011/0055917 A1 | 3/2011 | Wickstrom | |
| 2012/0075057 A1 | 3/2012 | Fyke et al. | |
| 2012/0075059 A1 | 3/2012 | Fyke et al. | |

FOREIGN PATENT DOCUMENTS

| | | | |
|---|---|---|---|
| EP | 1912339 | 7/2006 | H04B 1/59 |
| EP | 1912180 | 4/2008 | |
| EP | 1965595 | 9/2008 | H04Q 7/32 |
| WO | 9843196 | 10/1998 | |
| WO | 2006098690 | 9/2006 | |
| WO | 2009094683 | 8/2009 | |

OTHER PUBLICATIONS

"Cell Phones Replace Conventional Entry Tickets . . . and More" Parking Today Articles, Jun. 2006: www.parkingtoday.com (abstract only).
Magnussen, et al. "Security in NFC with WPS as a use case" University of Agder, Grimstad, Norway Jun. 2008.
"Radio Frequency Identification (RFID) Systems" Internet article on epic.org/publication date unknown, http://epic.org/privacy/rfid/.
Moore "RFID: You've Got to Hand It to Consumers" Internet article on aimglobal.org, Jun. 21, 2007, http://www.aimglobal.org/members/news/templates/template.aspx?articleid=2634&zoneid=24.
"No escaping RFID: Infiltrating every mobile phone by 2010?" Internet article on Gadgetell.com, Jun. 25, 2009, http://www.gadgetell.com/tech/comment/no-escaping-rfidinfiltrate-every-mobile-phone-by-2010/.
Wireless Dynamics' new iCarte attaches to the bottom of the iPhone and turns the iPhone into an NFC phone as well as an RFID Reader/Writer. htttc://www.infosyncworld.com/news/n/10659.html.
Strommer et al. "Ultra-low Power Sensors with Near Field Communication for Mobile Applications "http://www.springerlink.com/content/k82516671000605w/ (abstract only).
Bluetooth http://tinyurl.com/ybc6e3q.
Antoniou et al. Using RFID-based "Touch" for Intuitive User Interaction with Smart Space Security http://www.springerlink.con/content/u7476t2ulv1443m2/ (Abstract Only).
NFC http://www.phonescoop.com/glossary/term.php?gid=307.
U.S. Appl. No. 12/888,599, filed Sep. 23, 2010, Fyke, et al.
NFC mobile phones replace hotel room keys in Sweden http://www.hospitalitynet.org/news/4048931.search?query=nfc+mobile+phones+replace+hotel+room+keys+in+sweden Nov. 3, 2010, pp. 1-3.
Patron-Pro: NVC Access System: http://www.patronpro.cz/en/ printed Feb. 23, 2011, pp. 1-2.
Fyke et al., U.S. Appl. No. 12/888,599, filed Sep. 23, 2010.
Carbonell Duque et al., U.S. Appl. No. 13/034,059, filed Feb. 24, 2011.
Vingcard "Signature RFID' by VingCard + NFC-Compatible Cell Phones Awarded 'Best Innovation in the Technologies & Networks Category' at Equip Hotel in Paris" Nov. 6, 2006: www.vingcard.com, pp. 1-4.
"Cell Phones Replace Conventional Entry Tickets . . . and More" Parking Today Articles, Jun. 2006: www.parkingtoday.com (abstract only), p. 1.
Magnussen, et al. "Security in NFC with WPS as a use case" University of Agder, Grimstad, Norway Jun. 2008, p. 1.
"Radio Frequency Identification (RFID) Systems" Internet article on epic.org/, http://epic.org/privacy/rfid/, retrieved from the internet Sep. 24, 2010, pp. 1-5.
Moore "RFID: You've Got to Hand It to Consumers" Internet article on aimglobal.org, Jun. 21, 2007, http://www.aimglobal.org/members/news/templates/template.aspx?articleid=2634&zoneid=24, pp. 1-2.
"No escaping RFID: Infiltrating every mobile phone by 2010?" Internet article on Gadgetell.com, Jun. 25, 2009, http://www.gadgetell.com/tech/comment/no-escaping-rfidinfiltrate-every-mobile-phone-by-2010/, pp. 1-2.
Wireless Dynamics' new iCarte attaches to the bottom of the iPhone and turns the iPhone into an NFC phone as well as an RFID Reader/Writer. http://www.infosyncworld.com/news/n/10659.html, 1999-2010, p. 1.
Strommer et al. "Ultra-low Power Sensors with Near Field Communication for Mobile Applications "http://www.springerlink.com/content/k82516671000605w/, vol. 248/2007, 2007, pp. 131-142, (abstract only) p. 1.
"Bluetooth", http://tinyurl.com/ybc6e3q, retrieved from the internet Oct. 9, 2010, pp. 1-21.
Antoniou et al. Using RFID-based "Touch" for Intuitive User Interaction with Smart Space Security http://www.springerlink.com/content/u7476t2ulv1443m2/, 2009, II, pp. 255-287, (Abstract Only) p. 1.
NFC http://www.phonescoop.com/glossary/term.php?gid=307, retrieved from the internet Oct. 9, 2010, p. 1.
NFC mobile phones replace hotel room keys in Sweden http://www.hospitalitynet.org/news/4048931.search?query=nfc+mobile+phones+replace+hotel+room+keys+in+sweden Nov. 3, 2010.
Patron-Pro: NVC Access System: http://www.patronpro.cz/en/ printed Feb. 23, 2011.
U.S. Appl. No. 13/034,059, filed Feb. 24, 2011, Carbonell Duque, et al.

* cited by examiner

COMMUNICATIONS SYSTEM PROVIDING PERSONNEL ACCESS BASED UPON NEAR-FIELD COMMUNICATION AND RELATED METHODS

TECHNICAL FIELD

This application relates to the field of communications, and more particularly, to electronic devices and related methods that use near-field communication (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology may be used for contactless short-range communications using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

DETAILED DESCRIPTION

Figure 1:
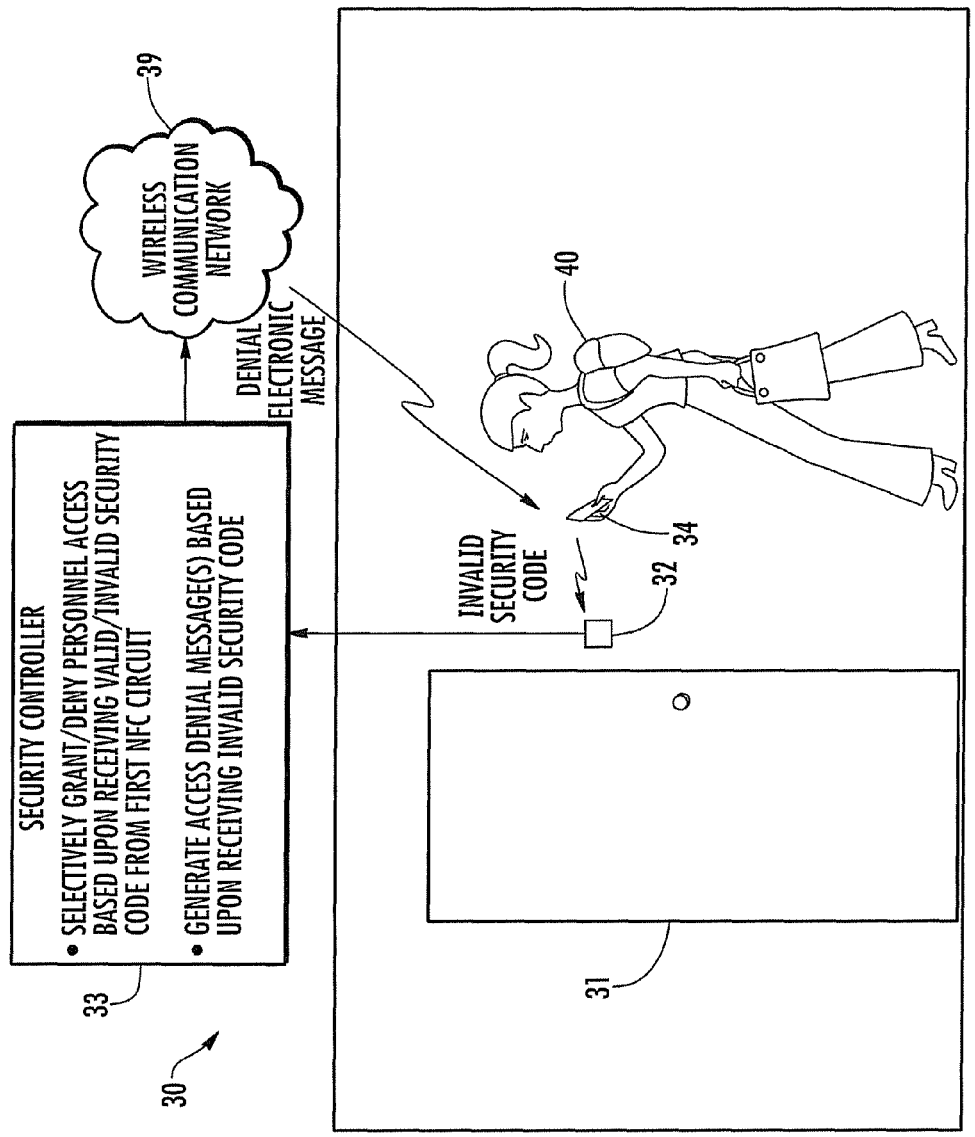
FIG. 1 is a schematic block diagram of a security system in accordance with one example embodiment.

The present description is made with reference to the accompanying drawings, in which exemplary embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

Generally speaking, a security system is disclosed herein which may include an access control device associated with a personnel access position. The access control device may include a first Near-Field Communication (NFC) sensor, and a first controller configured to selectively grant personnel access based upon receiving a valid security code from the first NFC sensor, and to deny personnel access and generate at least one access denial electronic message based upon receiving an invalid security code from the first NFC sensor. The security system may also include at least one mobile wireless communications device comprising a second NFC sensor, a wireless receiver, and a second controller. The second controller may be configured to communicate a security code via the second NFC sensor to the first NFC sensor based upon proximity therewith, and to receive a corresponding access denial electronic message from the first controller via the wireless receiver based upon the security code being invalid. As such, the system advantageously provides an approach for using mobile wireless communications devices to provide personnel access based upon NFC security code exchange and while providing denial electronic messages to the mobile wireless communication devices, allowing for explanations of denied access, for example.

More particularly, the first controller may be configured to selectively grant personnel access further based upon receiving additional authentication data from the wireless receiver. By way of example, the valid security code may comprise a single-use security code. Furthermore, the at least one mobile wireless communications device may comprise a plurality thereof, and the second controller may be configured to receive the valid security code from another mobile wireless communications device.

In some embodiments, the second controller may be configured to receive the valid security code via the second NFC sensor. Also, the at least one mobile wireless communications device may further include a wireless receiver, and the second controller may be configured to receive the valid security code via the wireless receiver. The second controller may receive the access denial message via the second NFC sensor or the wireless receiver, for example. Also by way of example, the wireless receiver may comprise a cellular receiver, a Wireless Local Area Network (WLAN) receiver, etc. Additionally, the access denial message may comprise an access denial electronic mail (email) message.

A related mobile wireless communications device, such as the one discussed briefly above, and a related security method are also provided. The security method may be for an access control device associated with a personnel access position and comprising a first NFC sensor, and at least one mobile wireless communications device comprising a second NFC sensor and a wireless receiver. The method may include communicating a security code from the second NFC sensor to the first NFC sensor based upon proximity therewith. The method may further include selectively granting personnel access based upon the security code from the first NFC sensor being valid, and denying personnel access and generating at least one access denial electronic message based upon the security code from the first NFC sensor being invalid. In addition, a corresponding access denial electronic message may be received at the at least one mobile wireless communications device from the access control device based upon the security code being invalid.

A related access control device, such as the one described briefly above, and security method are also provided. The method may include generating a temporary security code at a given electronic device based upon the unique ID associated therewith, receiving the temporary security code at the at least one mobile wireless communications device from the given electronic device, and receiving the temporary security code at the access control device from the first NFC sensor via NFC communications. The method may further include selectively granting personnel access via the access control device based upon the received temporary security code, and determining the unique ID associated with the given electronic device at the access control device.

A related computer-readable medium is also provided having computer-executable instructions for causing an access control device to perform steps including receiving the temporary security code from the first NFC sensor via NFC communications, selectively granting personnel access based upon the received temporary security code, and determining the unique ID associated with the given electronic device.

Figure 2:
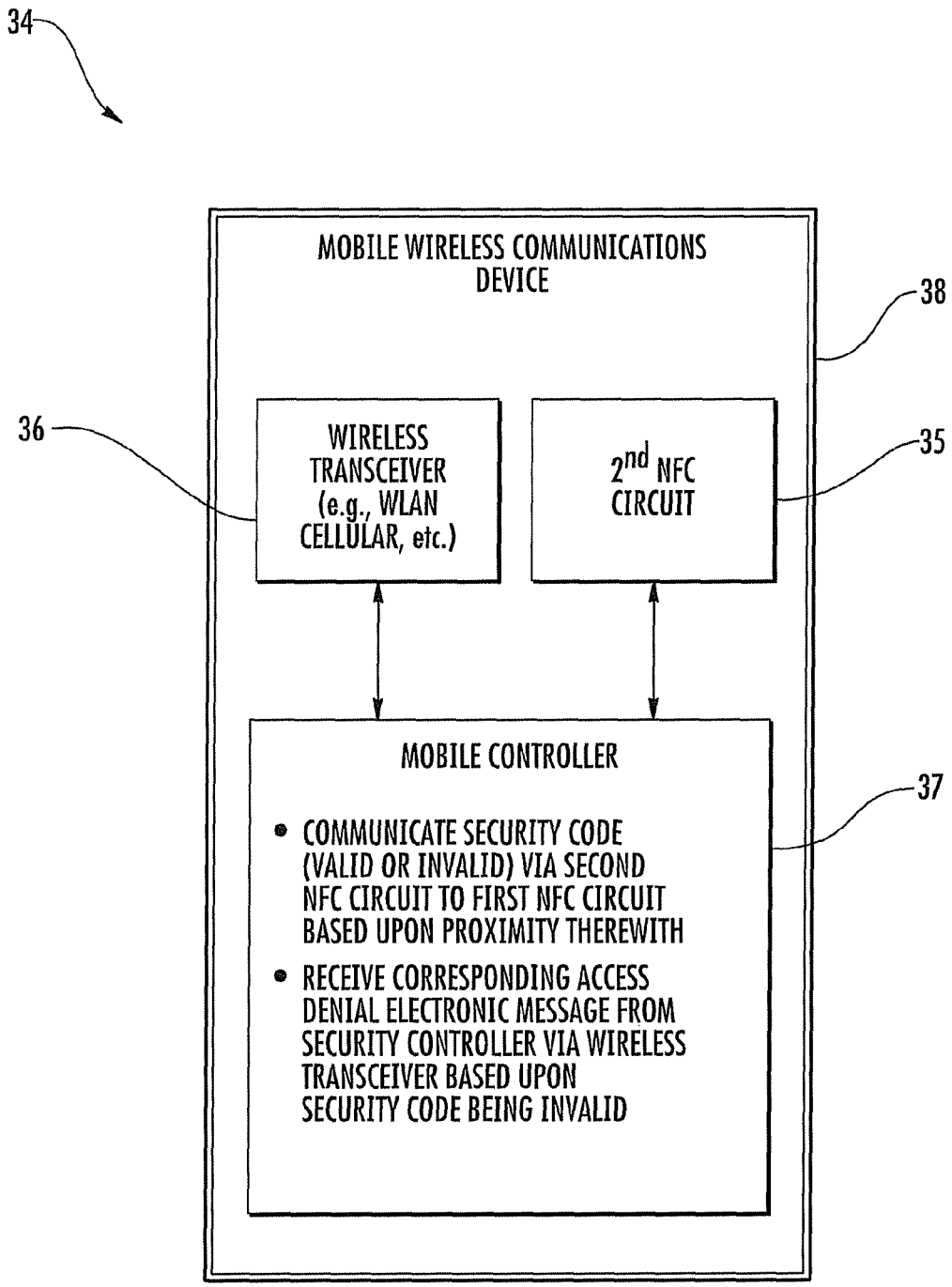
FIG. 2 is a schematic block diagram of the mobile wireless communications device of the system of FIG. 1 shown in greater detail.

Referring initially to FIGS. 1 and 2, a security system 30 is first described. By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

The system 30 illustratively includes an access control device associated with a personnel access position. In the illustrated example, the personnel access position is at a security door 31 which is locked to prevent unauthorized access to a particular area. In other embodiments, however, the personnel access position may correspond to a security gate or turnstile, or to a secure object such as a safe, locker, or a vehicle, for example. The access control device illustratively includes a first NFC sensor (e.g., an NFC transceiver) 32, and a controller 33, which will be referred to as a security controller herein for clarity of reference. These components may be co-located or separately located in different embodiments. For example, the NFC sensor 32 may be located at the personnel access position, and the security controller 33 may be co-located therewith or remotely connected to the NFC sensor, such as over a local area network (LAN), wireless communications link, the Internet, etc.

The security system 30 also illustratively includes a mobile wireless communications device 34 (also referred to as a "mobile device" herein) which comprises a second NFC sensor 35, a wireless receiver or transceiver 36 which communicates via a wireless communications network 39, and a controller 37, which will be referred to as the "mobile controller" herein for clarity of reference since it is located in the mobile device. By way of example, the wireless transceiver 36 may comprise a cellular transceiver, a Wireless Local Area Network (WLAN) transceiver, etc. The mobile device 34 components may be carried by a portable housing 38. By way of example, the security controller 33 and the mobile controller 37 may be implemented using a combination of hardware (e.g., microprocessor, etc.) and non-transitory computer readable medium components including computer-readable instructions for causing the various operations discussed herein to be performed. Example mobile devices may include portable or personal media players (e.g., MP3 players, video players, etc.), remote controls (e.g., television or stereo remotes, etc.), portable gaming devices, portable or mobile telephones, smartphones, etc.

In its current implementation, NFC is a short range variant of radio-frequency identification (RFID), typically operating at approximately 13.56 MHz. NFC technology allows a wireless connection to be established between a mobile device that has an embedded NFC chipset and an NFC reader terminal (e.g., 14443A/B, Felica, ISO 15693) at a range of about 10 cm, so that the devices are "swiped", "bumped", "tapped", or otherwise moved relative to one another to be in close proximity to communicate. NFC is a standardized technology that may be used in various applications such as mobile banking, ticketing, secure physical access, etc. However, it should be noted that, as used herein, "NFC" includes other similar short-range wireless communication formats that may have a different operating frequency, effective range, etc. The first and second NFC sensors 32, 35 may be passive tags or active readers depending upon the given implementation.

Figure 5:
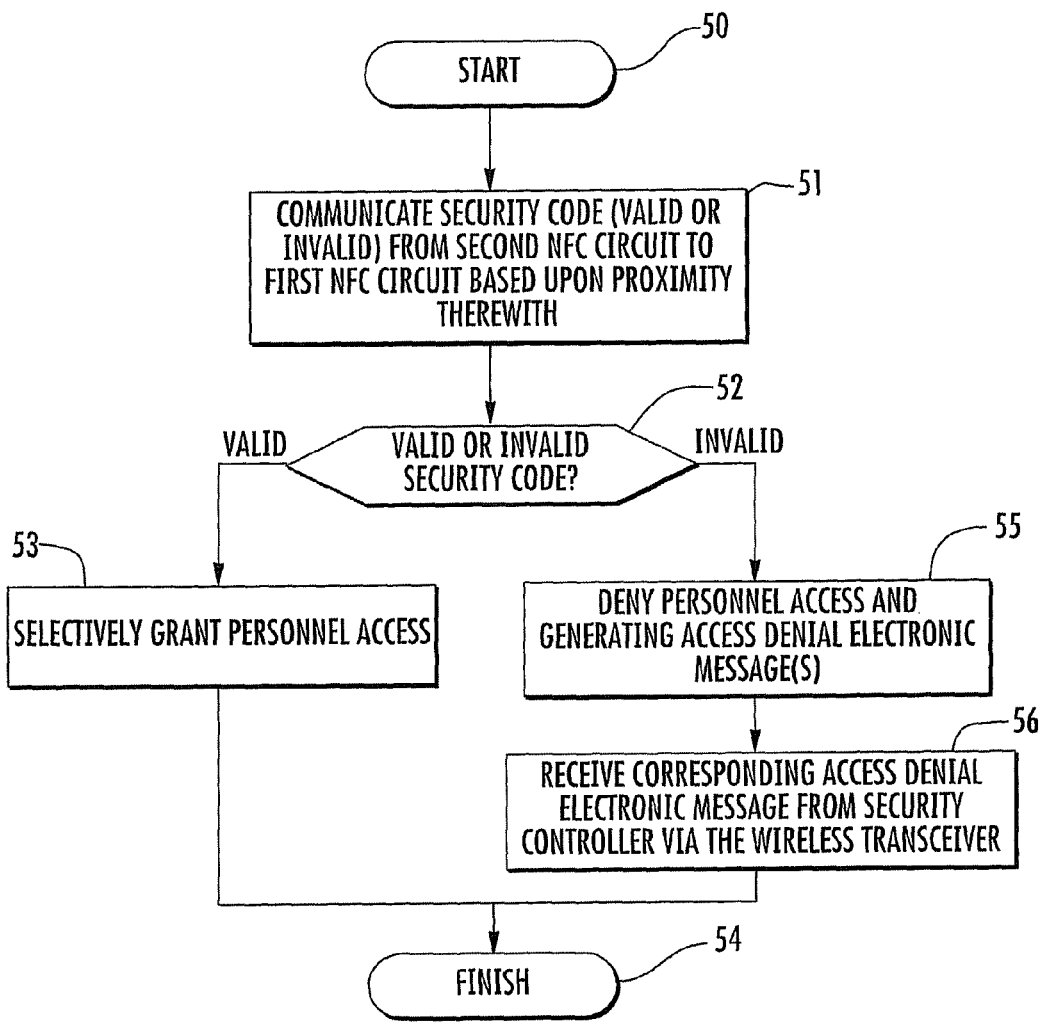
FIGS. 5 and 6 are flow diagrams illustrating method aspects associated with the system of FIG. 1 and mobile wireless communications devices of FIGS. 2 through 4.

Referring additionally to FIG. 5, operation of the security system 30 is now further described. Beginning at Block 50, the mobile controller 37 is configured to communicate a security code, which may be valid or invalid, via the second NFC sensor 35 to the first NFC sensor 32 based upon proximity therewith (i.e., when they are within NFC communication range), at Block 51. By way of example, the security code may comprise a series of alphanumeric characters, and in some embodiments the security code may be encrypted to provided enhanced security. The security controller 33 is configured to selectively grant personnel access based upon receiving a valid security code from the first NFC sensor 32, at Blocks 52 and 53, which illustratively concludes the method shown in FIG. 5 at Block 54. However, if the mobile controller 37 instead provides an invalid security code, then the security controller 33 denies personnel access and generates at least one access denial electronic message, at Block 55. The mobile controller 37 is configured to receive the at least one denial electronic message (e.g., electronic mail (email) message, Short Message Service (SMS) message, etc.) from the security controller 36 via the second NFC sensor 35 or the wireless transceiver 36 based upon communicating the invalid security code, at Block 56.

In this way, the person attempting to obtain access may advantageously be informed as to the reason that access was denied. For example, a particular security code may only be valid during certain times of the day, or certain days of the week, but invalid outside of those times. Another example is that a security code may be valid for a particular access point (e.g., the front of a building), but not other access points (e.g., a back entrance to the building). The denial message may also inform the user who the appropriate contact is to obtain access.

Figure 3:
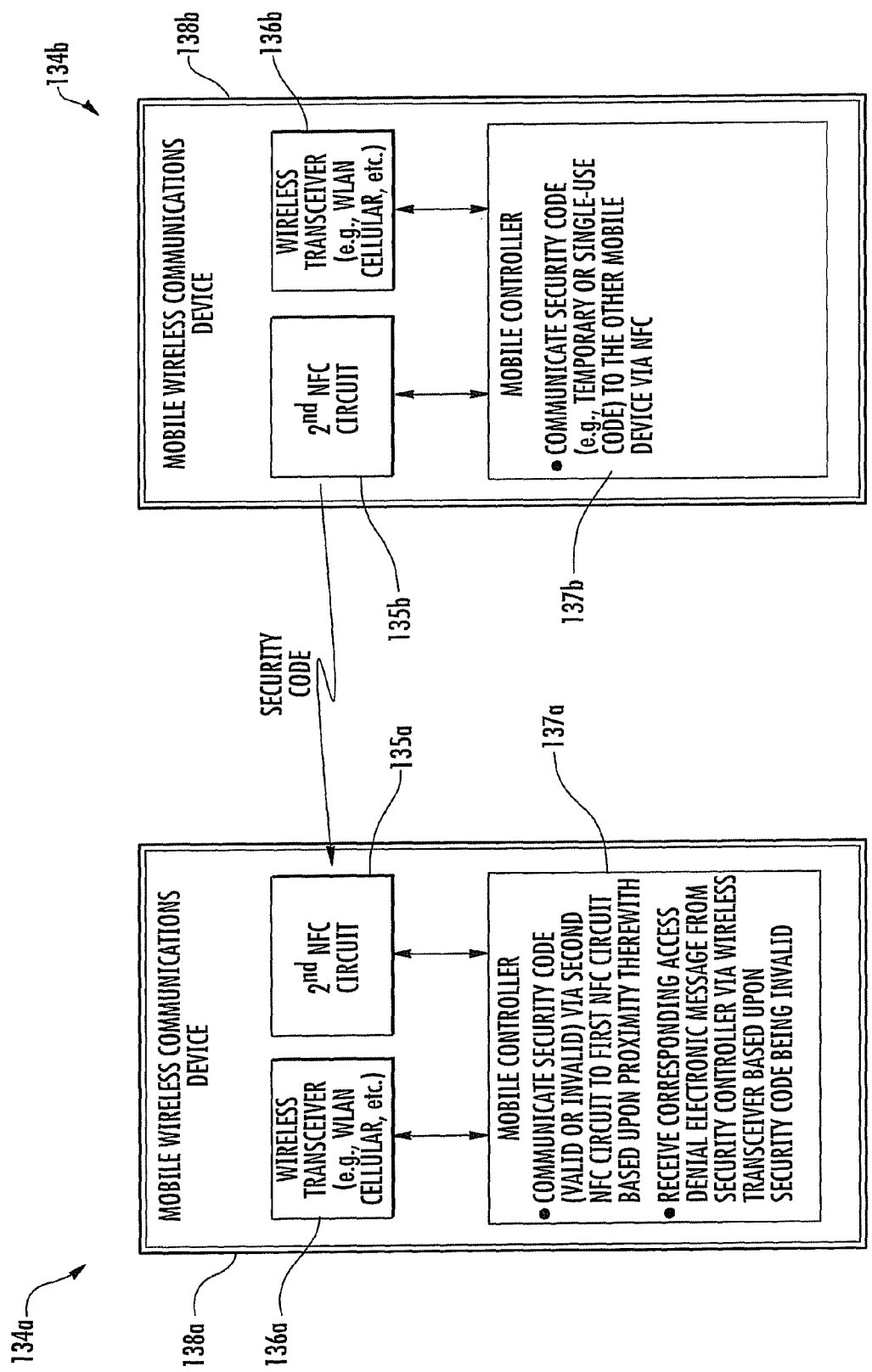
FIG. 3 is a schematic block diagram in which a plurality of mobile wireless communications devices are shown for use with the security system of FIG. 1.
Figure 4:
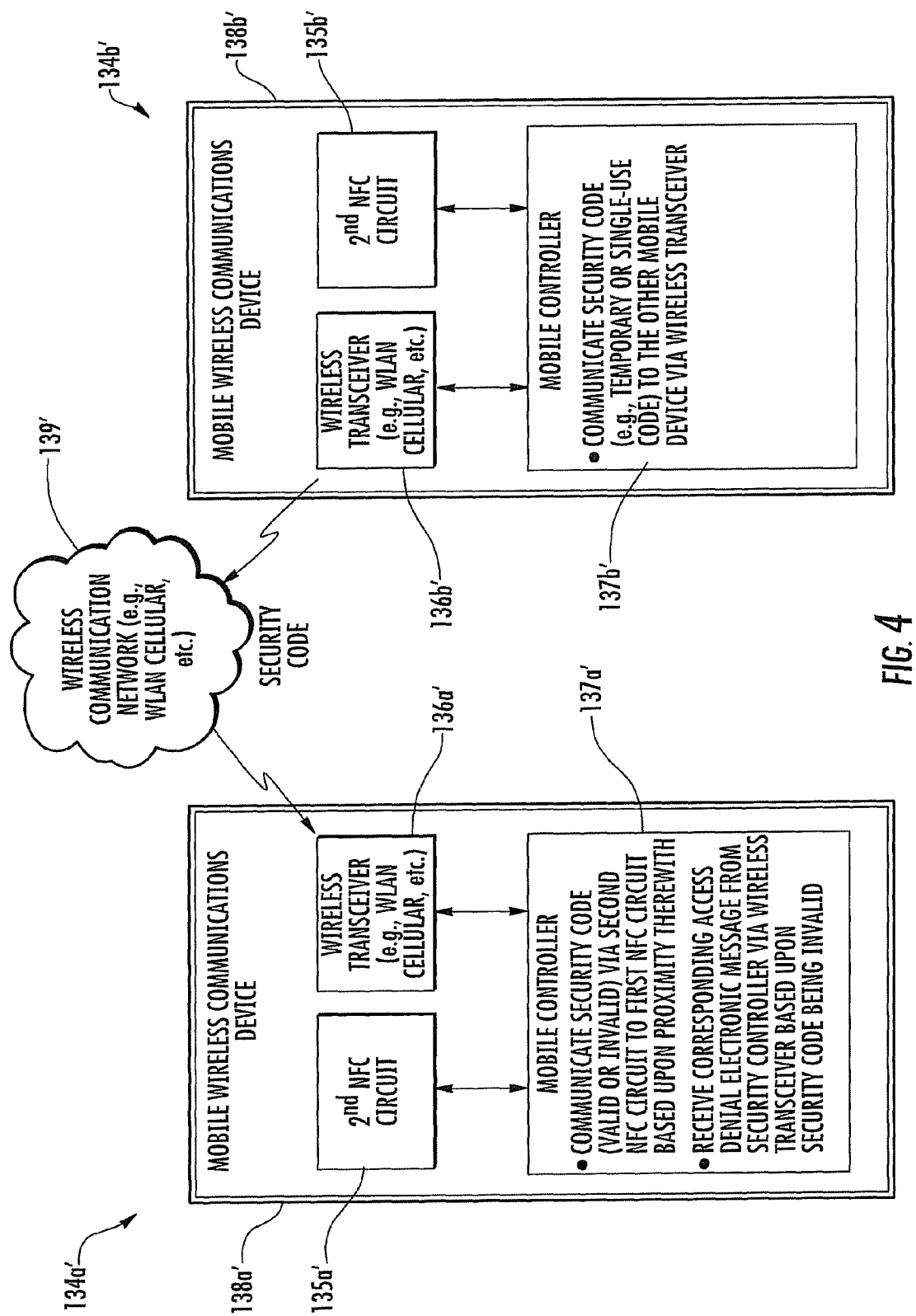
FIG. 4 is a schematic block diagram of an alternative embodiment of the mobile wireless communications devices of FIG. 3.

Turning now additionally to FIGS. 3 and 4, in some embodiments one or more mobile devices 134a, 134b may be used. It should be noted that in the illustrated embodiments the components which are similar to those already described above with reference to FIG. 2 are indicated by increments of one-hundred (e.g., the wireless transceiver 36 is similar to the wireless transceivers 136a, 136b, etc.) for convenience of reference. Not only does the use of multiple mobile devices 134a, 134b allow them to individually communicate with the access control device to gain personnel access, but this may also allow one mobile device to exchange a security code with the other device. That is, one of the mobile devices 134a may advantageously receive a valid security code from the other mobiles device 134b.

Thus, for example, the mobile device 134b may have an authorized valid security code assigned thereto (such as for an employee, etc.), and the mobile controller 137b may provide a temporary or single-use (i.e., "one-time") code to the other mobile device 134a (see Block 51', FIG. 6), such as to allow guest or visitor access, for example. In one use case, the mobile device 134b may provide a valid security code to the mobile device 134a for an event by tapping the devices together, or sending an email or SMS message with the appropriate information. That is, in some embodiments the mobile controller 137a may be configured to receive the valid security code via the second NFC sensor 135a, as seen in FIG. 3. In other embodiments, the mobile controller 137a' may be configured to receive the valid security code via the wireless transceiver 136a and the wireless communications network 139', as seen in FIG. 4.

Figure 6:
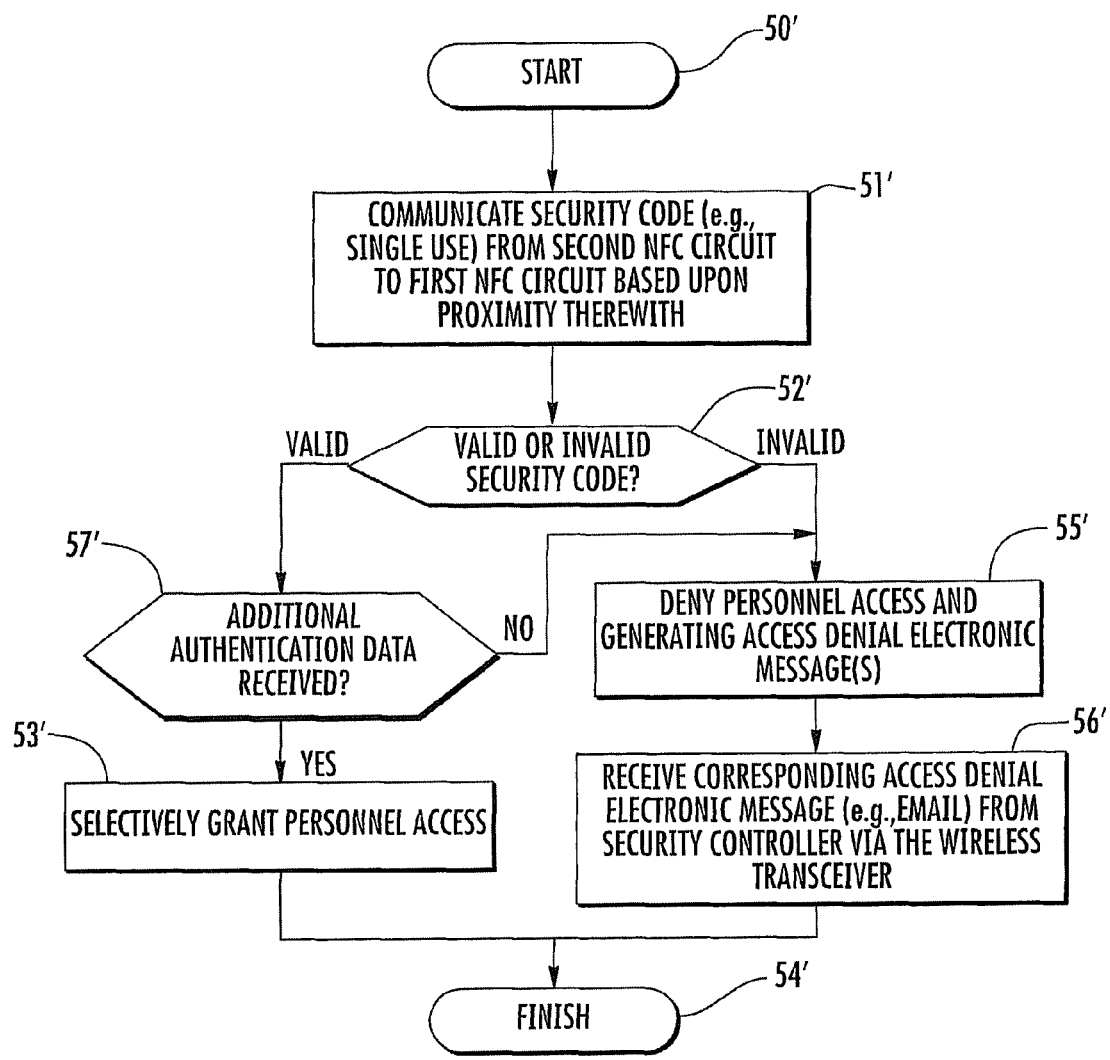

Referring additionally to FIG. 6, in some embodiments it may be desirable to grant personnel access based not only on provision of a valid security code, but also based upon additional authentication data from the wireless transceiver 36, such as biometric data (e.g., fingerprint, iris, retina, etc.), a password or personal identification number (PIN), etc., at Block 57'. In one example implementation, when the mobile device 34 is swiped or bumped to begin NFC communication, a prompt may be provided (such as on a display of the mobile device) to authenticate the mobile device, and the mobile controller 37 may communicate with the security controller 33 via the wireless transceiver 36 to thereby provide access upon receiving the correct additional authentication information.

Turning now to FIGS. 7 through 10, in accordance with another advantageous embodiment a security system 230 illustratively includes a plurality of electronic devices 231a-231n, each having a unique identification (ID) associated therewith. By way of example, the electronic devices 231a-231n may comprise computers (e.g., PCs, Macs, etc.), mobile devices such as those noted above, etc. Beginning at Blocks 250, 250', each electronic device 231a-231n is configured to generate a temporary security code based upon the unique ID, at Blocks 251, 251'. By way of example, the unique ID may be a unique alphanumeric code associated with the electronic device, such as an Internet Protocol (IP) address, a Uniform Resource Locator (URL) address, an International Mobile Equipment Identity (IMEI) number, a mobile device PIN, a phone number, etc. In other embodiments, the unique ID may instead be associated with a user to which the given electronic device 231 is assigned, such as an employee ID or PIN, etc.

The temporary security code may be a series of alphanumeric characters as described above, and may be used to provide temporary (e.g., single-use) access to a secure area, such as a building, office, storage area or locker, etc. The temporary security code may be generated using the unique ID as a key seed, such as with a cryptographic algorithm, or may instead be incorporated within or included as part of the temporary security code, for example. The temporary security code provides the requisite information for an access control device 240 to grant personnel access.

Figure 7:
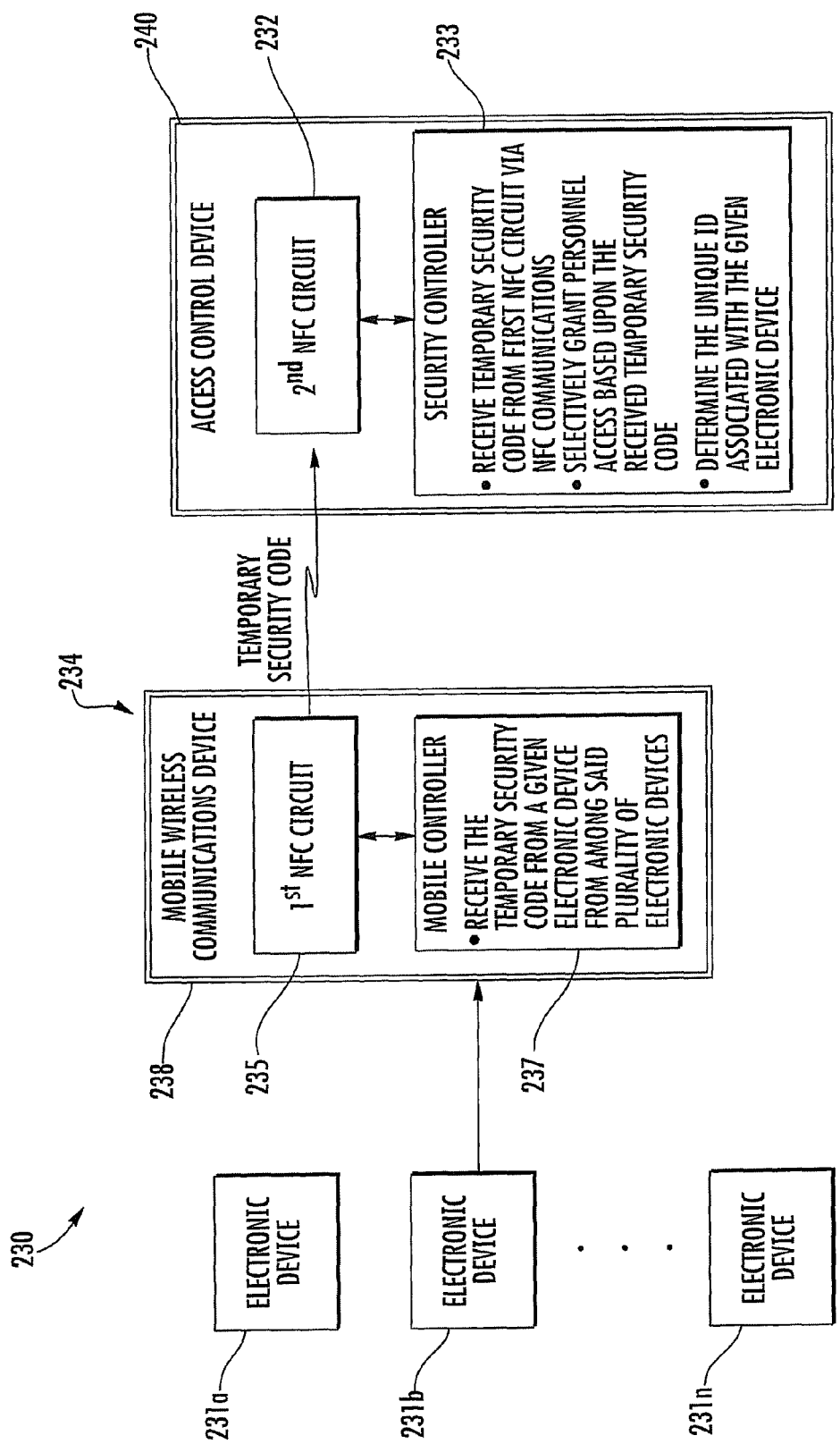
FIG. 7 is a schematic block diagram of another security system in accordance with an example embodiment.

The system 230 further illustratively includes one or more mobile devices 234 comprising a first NFC sensor 235, and a mobile controller 237 configured to receive the temporary security code from a given electronic device, namely the electronic device 231b in FIG. 7, from among the plurality of electronic devices 231a-231n, at Blocks 252, 252'. The temporary security code may be communicated to the mobile controller 237 via a third NFC sensor 241' in an NFC-enabled electronic device 231a', or via a wireless communications network 239' from an electronic device such as a mobile device 231b' comprising a wireless transceiver (e.g., cellular, WLAN, WiMAX, etc.), as seen in FIG. 8.

The access control device 240 is associated with a personnel access position, as noted above, and it illustratively includes a second NFC sensor 232 and a security controller 233. The security controller 233 is configured to receive the temporary security code from the first NFC sensor 235 via NFC communications, at Blocks 253, 253', selectively grant personnel access based upon the received temporary security code, at Block 254, and determine the unique ID associated with the given electronic device, at Block 255, thus concluding the method illustratively shown in FIG. 9. This advantageously allows one user to grant temporary access to another, such as to enter a building for a meeting, etc., while also allowing the security controller 233 to track the user who granted the temporary access. To this end, the access control device 240' shown in FIG. 8 further illustratively includes a security database 242' coupled to the security controller 233' and configured to update or maintain a log of unique IDs used for granting temporary access. The log may also include an indication of the mobile device 234' to which access was granted, date/time of access, etc.

Figure 10:
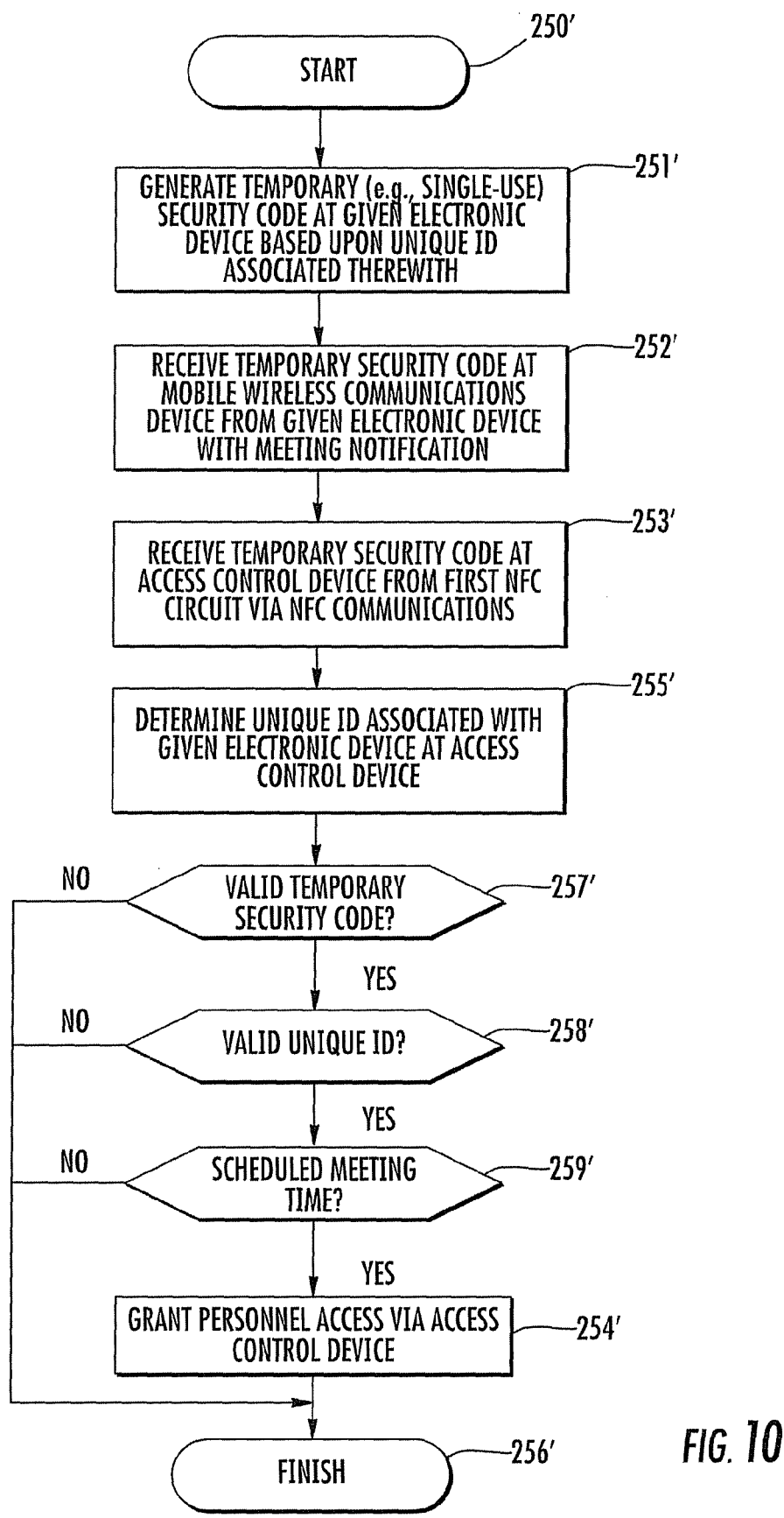

The determination as to whether to grant personnel access may be based upon factors other than whether a valid temporary security code is presented to the security controller 233, at Block 257' (FIG. 10). For example, the security controller 233 may also be configured to further selectively grant personnel access also based upon the determined unique ID. More particularly, the security controller 233' may check to see whether the unique ID is valid, at Block 258'. By way of example, a unique ID may no longer be valid if it corresponds to a user that is no longer an employee or is no longer authorized to grant access. Even though the unique ID may have been issued by an electronic device 231 having a valid unique ID at the time the temporary security code was issued, if the unique ID is no longer valid at the time access by the mobile device 234 is requested, then it may be desirable to exclude the temporary personnel access in some implementations.

Figure 8:
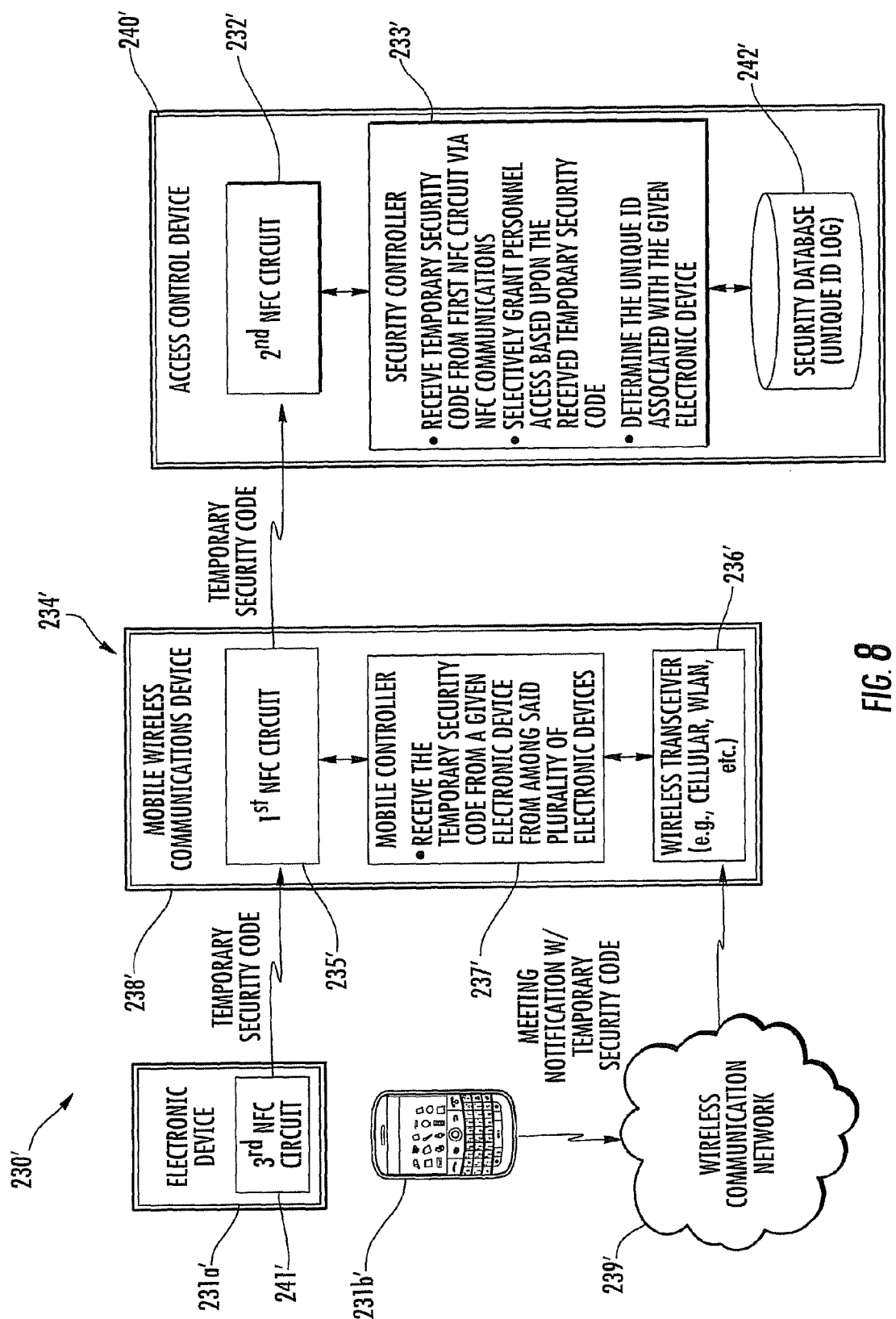
FIG. 8 is a schematic block diagram of an alternative embodiment of the system of FIG. 7.
Figure 9:
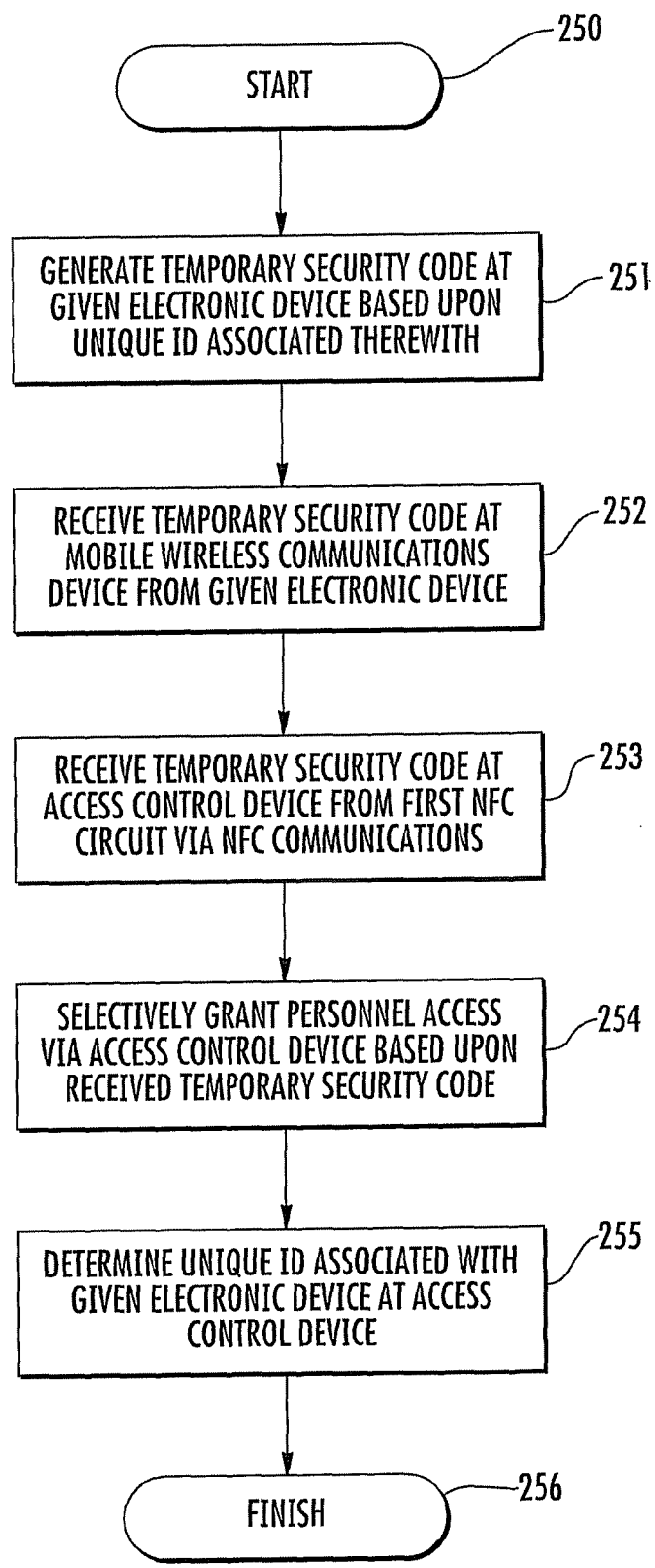
FIGS. 9 and 10 are flow diagrams illustrating method aspects associated with the systems of FIGS. 7 and 8.

In some embodiments, the temporary security code may be exchanged as part of, or along with, an event notification generated by a given electronic device, which in the embodiment of FIG. 8 is the mobile device 231b'. For example, a user may issue an event invitation from a PC or Mac computer, such as through Microsoft® Outlook, for example, and invite one or more participants to an event in the user's building at a scheduled event time (i.e., a given date and time). The event invitation may include a temporary security code that allows event attendees to temporarily access the building at the time of, or within a time window of (e.g., 15 minutes prior to the start time), the event. Depending upon the given embodiment, the temporary security code may be included as part of an initial event invitation, or may be provided in response to an acceptance of an event invitation, for example. If the temporary security code or unique ID is not valid, or it is not the scheduled time (or within a window of the scheduled time), then personnel access may be denied, which concludes the method illustrated in FIG. 10 (Block 256'). Otherwise, personnel access may be granted, at Block 254'.

A related computer-readable medium is also provided having computer-executable instructions for causing the access control device 240 to perform steps including receiving the temporary security code from the first NFC sensor 235 via NFC communications, selectively granting personnel access based upon the received temporary security code, and determining the unique ID associated with the given electronic device (i.e., the device 231b in FIG. 7). The computer-readable medium may further include computer-executable instructions for performing the additional steps described above.

Example components of a mobile device 1000 that may be used in accordance with the above-described embodiments are further described below with reference to FIG. 11. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 11:
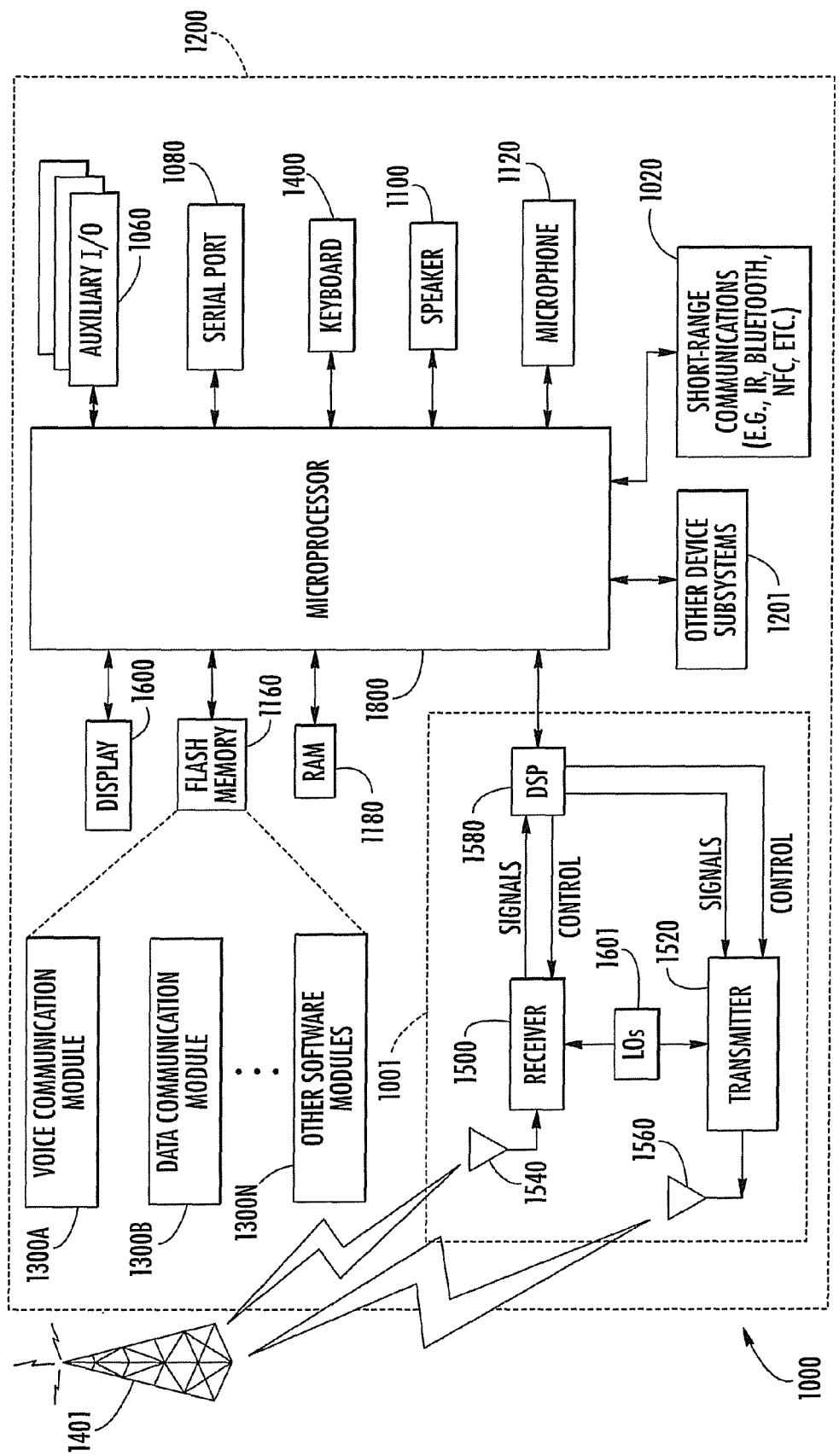
FIG. 11 is a schematic block diagram illustrating an example mobile wireless device components that may be used with the mobile wireless communications devices of the example embodiments.

In addition to the processing device 1800, other parts of the mobile device 1000 are shown schematically in FIG. 11. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOS) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, NFC or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A security system comprising:
an access control device associated with a personnel access position comprising
a first Near-Field Communication (NFC) sensor, and
a first controller configured to selectively grant personnel access based upon receiving a valid security code from said first NFC sensor, and to deny personnel access and generate at least one access denial electronic message based upon receiving an invalid security code from said first NFC sensor; and
at least one mobile wireless communications device comprising
a second NFC sensor, and
a second controller configured to communicate a security code via said second NFC sensor to said first NFC sensor based upon proximity therewith, and to receive a corresponding access denial electronic message from said first controller based upon the security code being invalid.

2. The security system of claim 1 wherein said first controller is configured to selectively grant personnel access further based upon receiving additional authentication data from said second controller.

3. The security system of claim 1 wherein the valid security code comprises a single-use security code.

4. The security system of claim 1 wherein said at least one mobile wireless communications device comprises a plurality thereof; and wherein said second controller is configured to receive the valid security code from another mobile wireless communications device.

5. The security system of claim 1 wherein said second controller is configured to receive the valid security code via the second NFC sensor.

6. The security system of claim 1 wherein said second controller is configured to receive the access denial electronic message via said second NFC sensor.

7. The security system of claim 1 wherein said at least one mobile wireless communications device further comprises a wireless receiver coupled to said second controller.

8. The security system of claim 7 wherein said second controller is configured to receive the valid security code via said wireless receiver.

9. The security system of claim 7 wherein said second controller is configured to receive the access denial electronic message via said wireless receiver.

10. A mobile wireless communications device comprising:
a first Near-Field Communication (NFC) sensor configured to communicate via NFC with an access control device associated with a personnel access position, the access control device comprising a second NFC sensor and being configured to selectively grant personnel access based upon receiving a valid security code, and to deny personnel access and generate at least one access denial electronic message based upon receiving an invalid security code; and
a controller configured to communicate a security code via said first NFC sensor to the second NFC sensor based upon proximity therewith, and to receive a corresponding access denial electronic message from the access control device based upon the security code being invalid.

11. The mobile wireless communications device of claim 10 wherein the valid security code comprises a single-use security code.

12. The mobile wireless communications device of claim 10 wherein said controller is configured to receive the access denial electronic message via the first NFC sensor.

13. The mobile wireless communications device of claim 10 further comprising a wireless receiver coupled to said controller; and wherein said controller is configured to receive the access denial electronic message via said wireless receiver.

14. The mobile wireless communications device of claim 10 wherein the access control device is further configured to selectively grant personnel access also based upon receiving additional authentication data from the mobile wireless communications device.

15. The mobile wireless communications device of claim 10 wherein said wireless receiver comprises a cellular receiver.

16. The mobile wireless communications device of claim 10 wherein said wireless receiver comprises a Wireless Local Area Network (WLAN) receiver.

17. The mobile wireless communications device of claim 10 wherein the access denial message comprises an access denial electronic mail (email) message.

18. A security method for a mobile wireless communications device comprising a first NFC sensor, the method comprising:
communicating a security code from the first NFC sensor to a second NFC sensor based upon proximity therewith, the second NFC sensor being comprised in an access control device associated with a personnel access position, the access control device being configured to selectively grant personnel access based upon receiving a valid security code, and to deny personnel access and generate at least one access denial electronic message based upon receiving an invalid security code; and
receiving a access denial electronic message from the access control device based upon the security code being invalid.

19. The method of claim 18 wherein the mobile wireless communications device further comprises a wireless receiver configured to communicate additional authentication data to the access control device via the wireless receiver; and wherein the access control device is further configured to selectively grant personnel access also based upon receiving the additional authentication data via the wireless receiver.

20. The method of claim 18 wherein the valid security code comprises a single-use security code.

21. The method of claim 18 further comprising receiving the valid security code from another mobile wireless communications device.

22. The method of claim 21 further comprising receiving the valid security code from the other mobile wireless communications device via the first NFC sensor.

23. The method of claim 21 wherein the mobile wireless communications device further comprises a wireless receiver; and further comprising receiving the valid security code to the other mobile wireless communications device via the wireless receiver.

* * * * *